United States Patent
Li et al.

(10) Patent No.: US 9,864,696 B2
(45) Date of Patent: Jan. 9, 2018

(54) MULTILEVEL CACHE-BASED DATA READ/WRITE METHOD AND APPARATUS, AND COMPUTER SYSTEM

(71) Applicant: Huawei Technologies Co., Ltd., Shenzhen (CN)

(72) Inventors: Ye Li, Beijing (CN); Lixin Zhang, Beijing (CN); Rui Hou, Beijing (CN); Ke Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 79 days.

(21) Appl. No.: 15/010,376

(22) Filed: Jan. 29, 2016

(65) Prior Publication Data

US 2016/0147666 A1     May 26, 2016

Related U.S. Application Data

(63) Continuation of application No. PCT/CN2014/083467, filed on Jul. 31, 2014.

(30) Foreign Application Priority Data

Jul. 31, 2013   (CN) .......................... 2013 1 0331344

(51) Int. Cl.
    *G06F 12/00*      (2006.01)
    *G06F 12/0897*    (2016.01)
    (Continued)

(52) U.S. Cl.
    CPC .......... *G06F 12/0897* (2013.01); *G06F 3/064* (2013.01); *G06F 3/0604* (2013.01);
    (Continued)

(58) Field of Classification Search
None
See application file for complete search history.

(56) References Cited

U.S. PATENT DOCUMENTS 5,689,679 A    11/1997   Jouppi
6,148,372 A    11/2000   Mehrotra et al.
(Continued)

FOREIGN PATENT DOCUMENTS

CN    101170555 A    4/2008
CN    102103552 A    6/2011
(Continued)

OTHER PUBLICATIONS

Foreign Communication From a Counterpart Application, Chinese Application No. 201310331344.6, Chinese Office Action dated Dec. 5, 2016, 5 pages.
(Continued)

*Primary Examiner* — Midys Rojas
(74) *Attorney, Agent, or Firm* — Conley Rose, P.C.

(57) ABSTRACT

A multilevel cache-based data read/write method and a computer system. The method includes acquiring a query address of a physical memory data block in which data is to be read/written, acquiring a cache location attribute of the physical memory data block, querying whether a cache is hit until one cache is hit or all caches are missed, where the querying is performed according to the query address in descending order of levels of caches storable for the physical memory data block, and the levels of the caches are indicated by the cache location attribute, and if one cache is hit, reading/writing the data in the query address of the physical memory data block in the hit cache; or, if all caches are missed, reading/writing the data in the query address of the physical memory data block in a memory.

18 Claims, 7 Drawing Sheets

(51) Int. Cl.
*G06F 12/1027* (2016.01)
*G06F 3/06* (2006.01)
*G06F 12/0811* (2016.01)

(52) U.S. Cl.
CPC ........ *G06F 3/0683* (2013.01); *G06F 12/0811* (2013.01); *G06F 12/1027* (2013.01); *G06F 2212/1016* (2013.01); *G06F 2212/50* (2013.01); *G06F 2212/60* (2013.01)

(56) References Cited

U.S. PATENT DOCUMENTS

| | | |
|---|---|---|
| 8,018,961 B2 | 9/2011 | Gopinath et al. |
| 2008/0101381 A1 | 5/2008 | Sun et al. |
| 2011/0153944 A1 | 6/2011 | Kursawe |
| 2013/0145102 A1 | 6/2013 | Wang et al. |
| 2014/0181401 A1 | 6/2014 | Huang |

FOREIGN PATENT DOCUMENTS

| | | |
|---|---|---|
| CN | 102369520 A | 3/2012 |
| CN | 102662861 A | 9/2012 |
| CN | 102725741 A | 10/2012 |
| CN | 103077131 A | 5/2013 |
| CN | 103218309 A | 7/2013 |

OTHER PUBLICATIONS

Foreign Communication From a Counterpart Application, European Application No. 14832818.0, Extended European Search Report dated May 30, 2016, 6 pages.

Foreign Communication From a Counterpart Application, PCT Application No. PCT/CN2014/083467, English Translation of International Search Report dated Oct. 27, 2014, 2 pages.

Foreign Communication From a Counterpart Application, PCT Application No. PCT/CN2014/083467, English Translation of Written Opinion dated Jul. 31, 2013, 5 pages.

MULTILEVEL CACHE-BASED DATA READ/WRITE METHOD AND APPARATUS, AND COMPUTER SYSTEM

CROSS-REFERENCE TO RELATED APPLICATIONS

This application is a continuation of International Application No. PCT/CN2014/083467, filed on Jul. 31, 2014, which claims priority to Chinese Patent Application No. 201310331344.6, filed on Jul. 31, 2013, both of which are hereby incorporated by reference in their entireties.

TECHNICAL FIELD

The present disclosure relates to the field of data read/write of a computer system, and in particular, to a multilevel cache-based data read/write method and apparatus, and a computer system.

BACKGROUND

A cache (also referred to as a high-speed cache memory) is located between a central processing unit (CPU) and a memory and is primarily used to solve a problem of mismatch between a speed of CPU operation and a speed of memory read/write. Currently, a computer uses at most a three-level cache, where a high-speed small-capacity cache is used at level 1 cache (L1 cache), a medium-speed larger-capacity cache is used at level 2 cache (L2 cache), and a low-speed large-capacity cache is used at level 3 cache (L3 cache).

Based on the multi-level cache, a specific process of executing a read operation by a CPU in the prior art is as follows.

When a CPU core sends a data read request, a level-by-level search manner is applied. That is, data search begins in the L1 cache first; if there is no searching data in the L1 cache (cache miss), a search is performed in the L2 cache, and so on, until data is searched out.

In the foregoing process, the cache is generally hit after the search is performed multiple times. For example, assuming that data on which a read operation is to be performed is stored in the L3 cache, a data search is performed in the L3 cache only when both the L1 cache and the L2 cache are missed, which leads to low efficiency of cache access.

SUMMARY

Embodiments of the present disclosure provide a multilevel cache-based data read/write method and apparatus, and a computer system, which are conducive to improving cache access efficiency and therefore conducive to reducing a cache miss rate in a data read/write process.

To achieve the foregoing objective, the following technical solutions are provided in the embodiments of the present disclosure.

According to a first aspect, the present disclosure provides a multilevel cache-based data read/write method, including acquiring a first query address of a first physical memory data block in which data is to be read/written, acquiring a first cache location attribute of the first physical memory data block, where the first cache location attribute is used to indicate a level of a cache storable for the first physical memory data block, querying whether a cache is hit until one cache is hit or all caches are missed, where the querying is performed according to the first query address in descending order of levels of caches storable for the first physical memory data block, and the levels of the caches are indicated by the first cache location attribute, and if one cache is hit, reading/writing the data in the first query address of the first physical memory data block in the hit cache, or if all caches are missed, reading/writing the data in the first query address of the first physical memory data block in a memory.

In a first possible implementation manner, according to the first aspect, the first cache location attribute is set in a translation lookaside buffer (TLB) for the first physical memory data block according to an access status of the first physical memory data block, and the acquiring a first cache location attribute of the first physical memory data block includes querying, according to attribute information that is of a physical memory data block and stored in the TLB, a first cache location attribute corresponding to the first query address, where the TLB stores the attribute information of the physical memory data block and the attribute information includes a correspondence between a query address of a physical memory data block and a cache location attribute of the physical memory data block.

In a second possible implementation manner, according to the first aspect, the first cache location attribute is set in a system register for the first physical memory data block according to an access status of the first physical memory data block, and the acquiring a first cache location attribute of the first physical memory data block includes reading a cache location attribute stored in a current system register, and using the cache location attribute as the first cache location attribute of the first physical memory data block, where the system register is used to store the cache location attribute.

In a third possible implementation manner, according to the first aspect, the reading/writing the data in the first query address of the first physical memory data block in the hit cache includes reading/writing the data in the first query address of the first physical memory data block in the hit cache by using a direct data path to the hit cache, or the reading/writing the data in the first query address of the first physical memory data block in a memory includes reading/writing the data in the first query address of the first physical memory data block in the memory using a direct data path to the memory.

In a fourth possible implementation manner, with reference to the first aspect or any of the first three possible implementation manners, during data reading, if a level of the hit cache is a non-highest level in the levels, of the enterable caches, indicated by the first cache location attribute, the method further includes refilling, with to-be-read data, a cache whose level is higher than the level of the hit cache among the levels, of the enterable caches, indicated by the first cache location attribute, or if a level of the hit cache is a highest level in the levels, of the enterable caches, indicated by the first cache location attribute, skip refilling another cache with data, or if all caches are missed, the method further includes refilling, with to-be-read data, an enterable cache indicated by the first cache location attribute.

In a fifth possible implementation manner, with reference to the first aspect or any of the first three possible implementation manners, during data writing, after the writing the data in the first query address of the first physical memory data block in the hit cache, the method further includes, if the written data is shared data, initiating a shared data consistency request to another cache whose level is equal to and/or lower than the level of the hit cache among the levels, of the enterable caches, indicated by the first cache location attribute.

In a sixth possible implementation manner, with reference to the first aspect or any of the first five possible implementation manners, the first cache location attribute identifies the highest level among the levels of the caches storable for the first physical memory data block, or identifies a level of a cache that is not storable for the first physical memory data block.

According to a second aspect, the present disclosure provides a multilevel cache-based data read/write apparatus, where the apparatus is a central processing unit that includes multiple levels of caches, and the apparatus includes a first acquiring unit configured to acquire a first query address of a first physical memory data block in which data is to be read/written a second acquiring unit configured to acquire a first cache location attribute of the first physical memory data block, where the first cache location attribute is used to indicate a level of a cache storable for the first physical memory data block a querying unit configured to query whether a cache is hit until one cache is hit or all caches are missed, where the querying is performed according to the first query address obtained by the first acquiring unit and is performed in descending order of levels of caches storable for the first physical memory data block, and the levels of the caches are indicated by the first cache location attribute obtained by the second acquiring unit; and a read/write unit configured to if one cache is hit, read/write the data in the first query address of the first physical memory data block in the cache hit by the querying unit, or if a query result of the querying unit is that all caches are missed, read/write the data in the first query address of the first physical memory data block in a memory.

In a first possible implementation manner, according to the second aspect, the first cache location attribute is set in a TLB for the first physical memory data block according to an access status of the first physical memory data block, the second acquiring unit is configured to query, according to attribute information that is of a physical memory data block and stored in the TLB, a first cache location attribute corresponding to the first query address, where the TLB stores the attribute information of the physical memory data block and the attribute information includes a correspondence between a query address of a physical memory data block and a cache location attribute of the physical memory data block.

In a second possible implementation manner, according to the second aspect, the first cache location attribute is set in a system register for the first physical memory data block according to an access status of the first physical memory data block, and the second acquiring unit is configured to read a cache location attribute stored in a current system register, and use the cache location attribute as the first cache location attribute of the first physical memory data block, where the system register is used to store the cache location attribute.

In a third possible implementation manner, according to the second aspect, the read/write unit is configured to read/write the data in the first query address of the first physical memory data block in the hit cache using a direct data path to the hit cache, or the read/write unit is configured to read/write the data in the first query address of the first physical memory data block in the memory using a direct data path to the memory.

In a fourth possible implementation manner, with reference to the second aspect or any of the first three possible implementation manners, the read/write unit is further configured to, during data reading, if a level of the hit cache is a non-highest level in the levels, of the enterable caches, indicated by the first cache location attribute, refill, with to-be-read data, a cache whose level is higher than the level of the hit cache among the levels, of the enterable caches, indicated by the first cache location attribute, or if a level of the hit cache is a highest level in the levels, of the enterable caches, indicated by the first cache location attribute, skip refilling another cache with data, or if all caches are missed, refill, with to-be-read data, an enterable cache indicated by the first cache location attribute.

In a fifth possible implementation manner, with reference to the second aspect or any of the first three possible implementation manners, the read/write unit is further configured to, during data writing, if the written data is shared data, initiate a shared data consistency request to another cache whose level is equal to and/or lower than the level of the hit cache among the levels, of the enterable caches, indicated by the first cache location attribute.

In a sixth possible implementation manner, with reference to the second aspect or any of the first five possible implementation manners, the first cache location attribute identifies the highest level among the levels of the caches storable for the first physical memory data block, or identifies a level of a cache that is not storable for the first physical memory data block.

According to a third aspect, the present disclosure provides a computer system, including a memory and the foregoing apparatus.

According to the multilevel cache-based data read/write method and apparatus and the computer system provided in the embodiments of the present disclosure, a cache location attribute indicates a level of a cache storable for a physical memory data block, and whether a cache is hit is queried according to the enterable level indicated by the cache location attribute. Therefore, it is supported that a cache that does not need to be accessed can be skipped, and a cache is hit quickly, which is conducive to improving cache access efficiency and therefore conducive to enhancing a cache hit rate, and in other words, conducive to reducing a cache miss rate in a data read/write process. Specially, by restricting a cache location attribute, an infrequently accessed physical memory data block can be prevented from entering a high-level cache with insufficient resources, which is therefore conducive to reducing the cache miss rate in the data read/write process.

BRIEF DESCRIPTION OF DRAWINGS

To describe the technical solutions in the embodiments of the present disclosure more clearly, the following briefly introduces the accompanying drawings required for describing the embodiments.

DESCRIPTION OF EMBODIMENTS

The following clearly describes the technical solutions in the embodiments of the present disclosure with reference to the accompanying drawings in the embodiments of the present disclosure.

Figure 1:
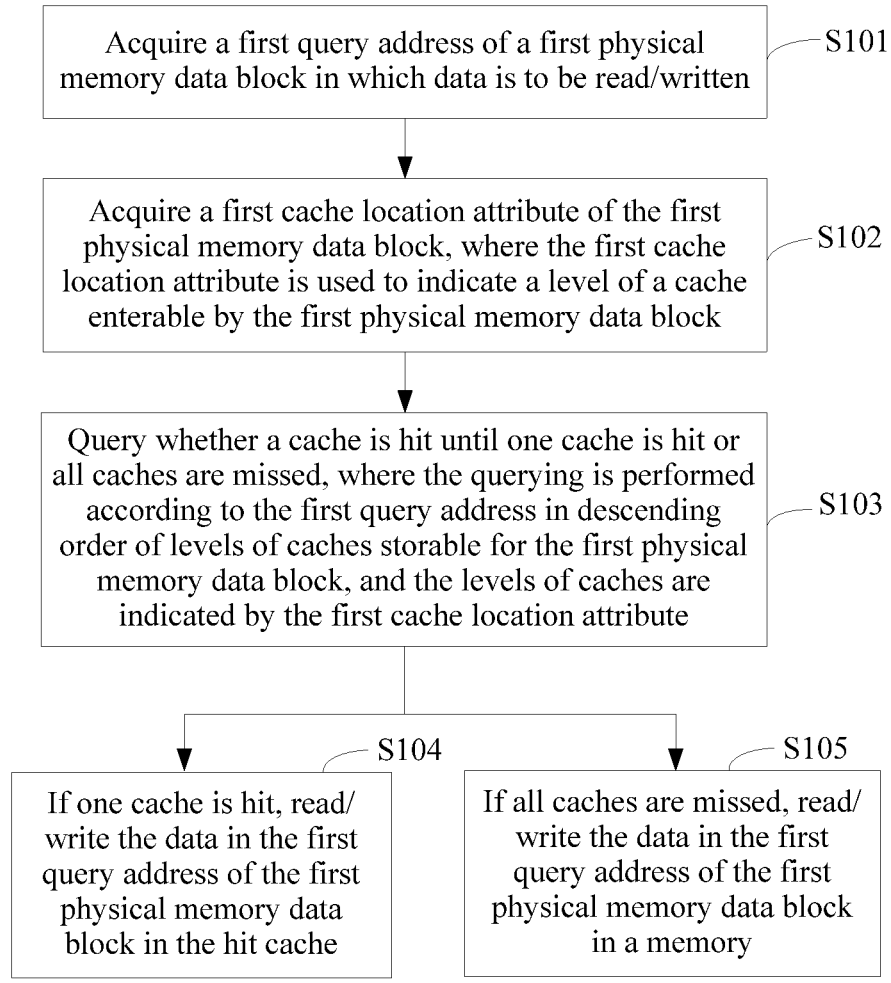
FIG. 1 is a schematic diagram of a multilevel cache-based data read/write method according to an embodiment of the present disclosure.

The present disclosure provides a multilevel cache-based data read/write method, and the method may be executed by a CPU core in a CPU that includes multiple levels of caches or by a hardware device with a read/write function and in a CPU that includes multiple levels of caches. The method is applicable to a single-core computer system and also applicable to a multi-core computer system. As shown in FIG. 1, the method includes:

Step S101. Acquire a first query address of a first physical memory data block in which data is to be read/written.

The physical memory data block refers to one of several storage units that are obtained by dividing a memory and used to store data in a computer system. For example, a storage unit may be a memory page, a memory segment, or data information that directly comes from input/output (I/O) or the like. Sizes of the storage units are not limited and may be the same or different. The query address may be a high-order bit of a physical address (PA) of the physical memory data block, which, certainly, is not limited thereto.

For clear description, in this embodiment of the present disclosure, a related object in a data read/write process is preceded by "first". For example, the first physical memory data block refers to a physical memory data block in a data read/write process, and the first query address refers to the high-order bit of the physical address of the first physical memory data block.

For example, the CPU core may include a TLB; and this step may be: obtain, from the TLB, the high-order bit of the physical address in a data read/write process. However, the TLB is not necessarily set in the CPU core.

When a multilevel buffer-based data read/write apparatus in the CPU core sends a data read/write request, the apparatus gives a virtual address (VA), and uses several high-order bits of the VA to search the TLB, and the TLB is responsible for translating the virtual address into the high-order bit of the physical address of the physical memory data block, such that the apparatus obtains the high-order bit of the physical address.

Step S102. Acquire a first cache location attribute of the first physical memory data block, where the first cache location attribute is used to identify a level of a cache storable for the first physical memory data block.

The first cache location attribute is set for the first physical memory data block according to an access status of the first physical memory data block.

Generally, a frequently accessed physical memory data block exists in a high-level cache, and an infrequently accessed physical memory data block exists in a low-level cache. In order to set the cache location attribute properly, the cache location attribute may be set for the physical memory data block according to the access status of the physical memory data block. The access status of the physical memory data block may be but is not limited to access frequency of the physical memory data block. The cache location attribute may also be set according to an attribute of the data block itself such as streaming data. To a great extent, such data may be discarded once the data is accessed for one time. Therefore, such data also does not need to enter a high-level cache.

Optionally, the memory generally stores attribute information of all physical memory data blocks. In this embodiment, several bits may be added in existing attribute information of a physical memory data block in the memory to identify a cache location attribute of each physical memory data block. In this case, the attribute information of the physical memory data block includes a correspondence between a query address of a physical memory data block and a cache location attribute of the physical memory data block, where the cache location attribute may be directly set by an operating system according to an access status of the physical memory data block during data block division. In addition, the memory may fill space of the TLB with the attribute information into which the cache location attribute is added, where the space is used to store an attribute item. Optionally, if a reserved bit (a bit that is not occupied) exists in original space of the TLB and is available for being filled with the cache location attribute, the space can be filled directly. Otherwise, width of the original space may be increased for being filled with the cache location attribute.

In this case, this step may be, when sending a data read/write request, the multilevel cache-based data read/write apparatus in the CPU core queries, according to the correspondence between the query address of the physical memory data block and the attribute information of the physical memory data block, a first cache location attribute corresponding to the first query address, where the correspondence is stored in the TLB.

Alternatively, optionally, in this embodiment of the present disclosure, the cache location attribute may be set to a system register included by the CPU. That is, a system register is added for storing the cache location attribute. A new instruction is added or some bits are added in an existing instruction set to specially set the register of the cache location attribute.

In this case, this step may be, when sending a data read/write request, the multilevel cache-based data read/write apparatus in the CPU core reads a cache location attribute stored in a current system register, and uses the cache location attribute as the first cache location attribute of the first physical memory data block.

Further, the first cache location attribute identifies a highest level among levels of caches storable for the first physical memory data block, or identifies a level of a cache that is not storable for the first physical memory data block.

For example, assuming that there are three levels of caches in total in a computer system, and for differentiation, 00, 01, and 10 may be used to represent a L1 cache, a L2 cache, and a L3 cache respectively. If the cache location attribute is 01, it indicates that the memory data block can enter the L2 cache at most, that is, the memory data block may enter the L2 cache or the L3 cache, but cannot enter the L1 cache. If the cache location attribute is 01, it indicates that the memory data block cannot enter the L2 cache, and correspondingly, the cache location attribute controls that the levels of the caches storable for the physical memory data block include the L1 cache and the L3 cache.

Because a one-to-one correspondence exists between the first physical memory data block and its first cache location attribute, for step S101 and step S102, the first cache location attribute of the first physical memory data block in which the data is to be read/written may be acquired first, and then the first query address of the first physical memory data block is acquired. Regardless of a manner of acquiring, the first query address and the first cache location attribute of the first physical memory data block need to be acquired.

Step S103. Query whether a cache is hit until one cache is hit or all caches are missed, where the querying is performed according to the first query address in descending order of levels of caches storable for the first physical memory data block, and the levels of caches are indicated by the first cache location attribute.

For a computer system with N levels of caches, the level-1 cache is the highest level, and the level-N cache is the lowest level. From the level-1 cache to the level-N cache, a cache level descends.

A process of querying, according to the first query address, whether a level-i ($1 \leq i \leq N$) cache is hit, may be searching the level-i cache by using several bits in the middle of the virtual address, and selecting a group of cache line tags (Tag), where the Tags may be high-order bits of the physical address (PA) and then comparing the first query address obtained from the TLB with the selected group of Tags, if a Tag of a cache line matches a high-order bit of the PA, the level-i cache is hit. Otherwise, the level-i cache is missed.

For example, it is assumed that there are three levels of caches in total in the computer system, the cache location attribute acquired in step S102 is 01, and it is indicated that the memory data block can enter the L2 cache at most. In this case, the multilevel cache-based data read/write apparatus in the CPU core ignores the L1 cache according to the cache location attribute, and queries directly whether the L2 cache is hit, and if the L2 cache is hit, the query process is ended, or if the L2 cache is missed, queries whether the L3 cache is hit, and if the L3 cache is hit, the query process is ended, or if the L3 cache is missed, because the L3 cache is a last level of cache, it means that all enterable caches under control of the first cache location attribute are missed, and the query process is also ended.

For another example, it is assumed that there are three levels of caches in total in the computer system, the cache location attribute acquired in step S102 is 01, and it is indicated that the memory data block cannot enter the L2 cache. Correspondingly, the cache location attribute controls that the levels of the caches storable for the physical memory data block include L1 and L3. In this case, the multilevel cache-based data read/write apparatus in the CPU core first queries, according to the cache location attribute, whether the L1 cache is hit, and if the L1 cache is hit, the query process is ended, or if the L1 cache is missed, queries whether the L3 cache is hit, and because the L3 cache is the last level of cache, the query process is ended no matter whether the L3 cache is hit or missed.

If one cache is hit in this step, step S104 is performed, and if all caches are missed in this step, step S105 is performed.

Step S104. If one cache is hit, read/write the data in the first query address of the first physical memory data block in the hit cache.

Preferably, a direct data path from each level of cache to the multilevel cache-based data read/write apparatus in the CPU core may be added in advance. In this case, this step may be read/write the data in the first query address of the first physical memory data block in the hit cache using a direct data path between the apparatus and the hit cache.

Certainly, the data may also be read/written in the first query address of the first physical memory data block in the hit cache using a data path established in the prior art.

Step S105. If all caches are missed, read/write the data in the first query address of the first physical memory data block in a memory.

Because the first physical memory data block can certainly be found in the memory, in a case that all caches are missed, this step may be used to implement data reading/writing.

According to the multilevel cache-based data read/write method provided in this embodiment of the present disclosure, a cache location attribute indicates a level of a cache storable for a physical memory data block, and whether a cache is hit is queried according to the enterable level indicated by the cache location attribute. Therefore, it is supported that a cache that does not need to be accessed can be skipped, and a cache is hit quickly, which is conducive to improving cache access efficiency and therefore conducive to enhancing a cache hit rate, and in other words, conducive to reducing a cache miss rate in a data read/write process. By restricting a cache location attribute, an infrequently accessed physical memory data block can be prevented from entering a high-level cache with insufficient resources, which is therefore conducive to reducing the cache miss rate in the data read/write process.

Further, during data reading, if a level of the hit cache is a non-highest level in the levels, of the enterable caches, indicated by the first cache location attribute, after the data is read in the first physical memory data block in the hit cache in step S104, the method further includes refilling, with to-be-read data, a cache whose level is higher than the level of the hit cache among the levels, of the enterable caches, indicated by the first cache location attribute, or if a level of the hit cache is a highest level in the levels, of the enterable caches, indicated by the first cache location attribute, skipping refilling another cache with data, or if all caches are missed, the method further includes, refilling, with to-be-read data, an enterable cache indicated by the first cache location attribute.

For example, it is assumed that there are three levels of caches in total in the computer system, the cache location attribute acquired in step S102 is 01, and it is indicated that the memory data block can enter the L2 cache at most. That is, the L2 Cache is the highest enterable level indicated by the first cache location attribute.

If the hit cache in step S103 is L2 cache, because the L2 cache is the highest enterable level indicated by the first cache location attribute, another cache (for example, the L1 cache) is not refilled with data.

If the hit cache in step S103 is L3 cache, after and while the data is read in the first physical memory data block in the L3 cache in step S104, the multilevel cache-based data read/write apparatus in the CPU core refills the L2 cache with the to-be-read data according to the enterable level indicated by the first cache location attribute. In this way, the L2 cache can be hit at a single attempt when the data is read/written in the first physical memory data block again.

If all caches are missed in step S103, after and while the data is read in the first physical memory data block in the memory in step S105, the multilevel cache-based data read/write apparatus in the CPU core refills the L3 cache and the L2 cache with the to-be-read data. In this way, the L2 cache can be hit at a single attempt of query in a process of reading the data for a next time.

By restricting the cache location level properly for the physical memory data block, for an application that leads to a high cache miss rate, infrequently accessed data can be prevented from being put into a cache with a high miss rate, so as to avoid futile cache data refill.

Further, to maintain consistency of shared data, during data writing, after the data is written in the first query address of the first physical memory data block in the hit cache in step S104, the method further includes, if the written data is shared data, initiating a shared data consistency request to another cache whose level is equal to and/or lower than the level of the hit cache among the levels, of the enterable caches, indicated by the first cache location attribute.

The shared data is that, in a cache structure of a multi-core processor, if one of CPU cores modifies a piece of data and the data also exists in a cache of another CPU core, the data is shared data between different CPU cores.

For example, assuming that two CPU cores (CPU core 0 and CPU core 1) exist in a computer system and each CPU core includes three levels of caches, if the CPU core 0 modifies data in an L1 cache among its caches and the data also exists in an L1 cache of the CPU core 1, the data is shared data of the CPU core 0 and the CPU core 1.

For example, it is assumed that there are three levels of caches in total in the computer system, the cache location attribute acquired in step S102 is 01, and it is indicated that the memory data block can enter the L2 cache at most. That is, the levels, of the enterable caches, indicated by the first cache location attribute include L2 and L3.

If the hit cache in step S103 is L2 cache and the written data in step S104 is shared data, (1) in a case in which the computer system includes not only the hit L2 cache but also another L2 cache, the multilevel cache-based data read/write apparatus in the CPU core initiates a shared data consistency request to the another L2 cache and the L3 cache; and (2) in a case in which the computer system does not include another L2 cache, the apparatus initiates a shared data consistency request only to the L3 cache.

If the hit cache in step S103 is L3 cache and the written data in step S104 is shared data, (1) in a case in which the computer system includes not only the hit L3 cache but also another L3 cache, the multilevel cache-based data read/write apparatus in the CPU core initiates a shared data consistency request only to the another L3 cache; and (2) in a case in which the computer system does not include another L3 cache, the apparatus does not initiate a shared data consistency request.

Shared data consistency is maintained primarily according to the following two manners.

One is a write-back manner. After new data is written into the hit cache, and after a shared data consistency request is initiated, according to the foregoing description, to another cache whose level is equal to and/or lower than the level of the hit cache among the levels, of the enterable caches, indicated by the first cache location attribute, shared data in the another cache that contains the shared data is set to be invalid.

For example, if the hit cache in step S103 is L2 cache and the written data in step S104 is shared data, the multilevel cache-based data read/write apparatus in the CPU core initiates a shared data consistency request to another L2 cache and the L3 cache. In this case, shared data in the another L2 cache and the L3 cache are set to be invalid.

Another is a write-through manner. After a shared data consistency request is initiated, according to the foregoing description, to another cache whose level is equal to and/or lower than the level of the hit cache among the levels, of the enterable caches, indicated by the first cache location attribute, shared data in the another cache whose level is equal to the level of the hit cache is set to be invalid. If the level of the hit cache is not a lowest level among the levels, of the enterable caches, indicated by the first cache location attribute, shared data in a lower-level cache is updated by newly written data.

For example, if the hit cache in step S103 is L2 cache and the written data in step S104 is shared data, the multilevel cache-based data read/write apparatus in the CPU core initiates a shared data consistency request to another L2 cache and the L3 cache. In this case, the shared data in the another L2 cache is set to be invalid, and the shared data in the L3 cache is updated.

Therefore, in a multi-core system environment, by setting a cache location attribute for a physical memory data block, a consistency request can be initiated pertinently to a cache that may have shared data, so as to reduce search and snooping for the cache.

An embodiment of the present disclosure provides a computer system, including a memory and a multilevel cache-based data read/write apparatus, where the apparatus is a CPU that includes multiple levels of caches, and the apparatus is used to perform steps in the foregoing method.

Figure 2:
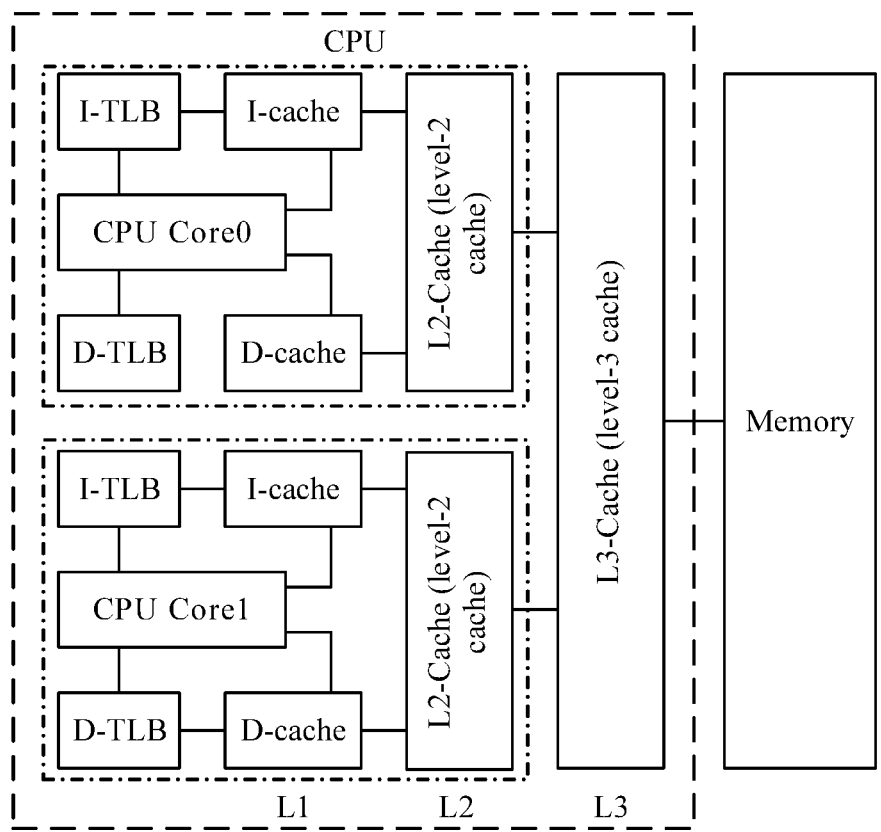
FIG. 2 is a schematic structural diagram of a computer system according to an embodiment of the present disclosure.

The present disclosure further provides specific instances to describe in detail the foregoing data read/write method. In each specific instance, a dual-core computer system is used as an example, and the dual-core computer system includes three levels of caches. Referring to FIG. 2, the computer system includes three levels of caches, an L1 cache that includes an instruction-cache (I-cache), a data-cache (D-cache), an L2 cache, and an L3 cache; a memory, and a CPU core.

The computer system may further include TLBs: an instruction-TLB (I-TLB), and a data-TLB (D-TLB). The TLB is responsible for translating a virtual address sent by the CPU core into a high-order bit of a physical address of a physical memory data block.

Furthermore, the L1 is a high-speed small-capacity cache, the L2 is a medium-speed larger-capacity cache, and the L3 is a low-speed large-capacity cache. The L1/L2 cache is a private cache of each CPU core, and the L3 cache is shared by multiple CPU cores. The private cache is privately owned by a CPU core, and the shared cache is shared by multiple CPU cores. In FIG. 2, the L1 and L2 caches in a dotted line box in the upper half part of FIG. 2 are private caches of the CPU core 0, the L1 and L2 caches in a dotted line box in the lower half part of FIG. 2 are private caches of the CPU core 1, and the L3 cache is a shared cache of the CPU core 0 and the CPU core 1.

In addition, in each embodiment below, the description uses an example in which the physical memory data block is a memory page, attribute information of a memory page is stored in a page table, and a memory stores page tables of all memory pages. The attribute information of the memory page may indicate whether the memory page is shared, whether the memory page can enter a cache, and the like.

Embodiment 1

The following provides a specific implementation solution for a multilevel cache-based data read method according to the foregoing computer system.

In the multilevel cache-based data read method provided in this embodiment, attribute information in the foregoing memory page further includes cache location attribute information of a physical memory page, where the cache location attribute information is set according to an access status of the physical memory page.

Figure 3:
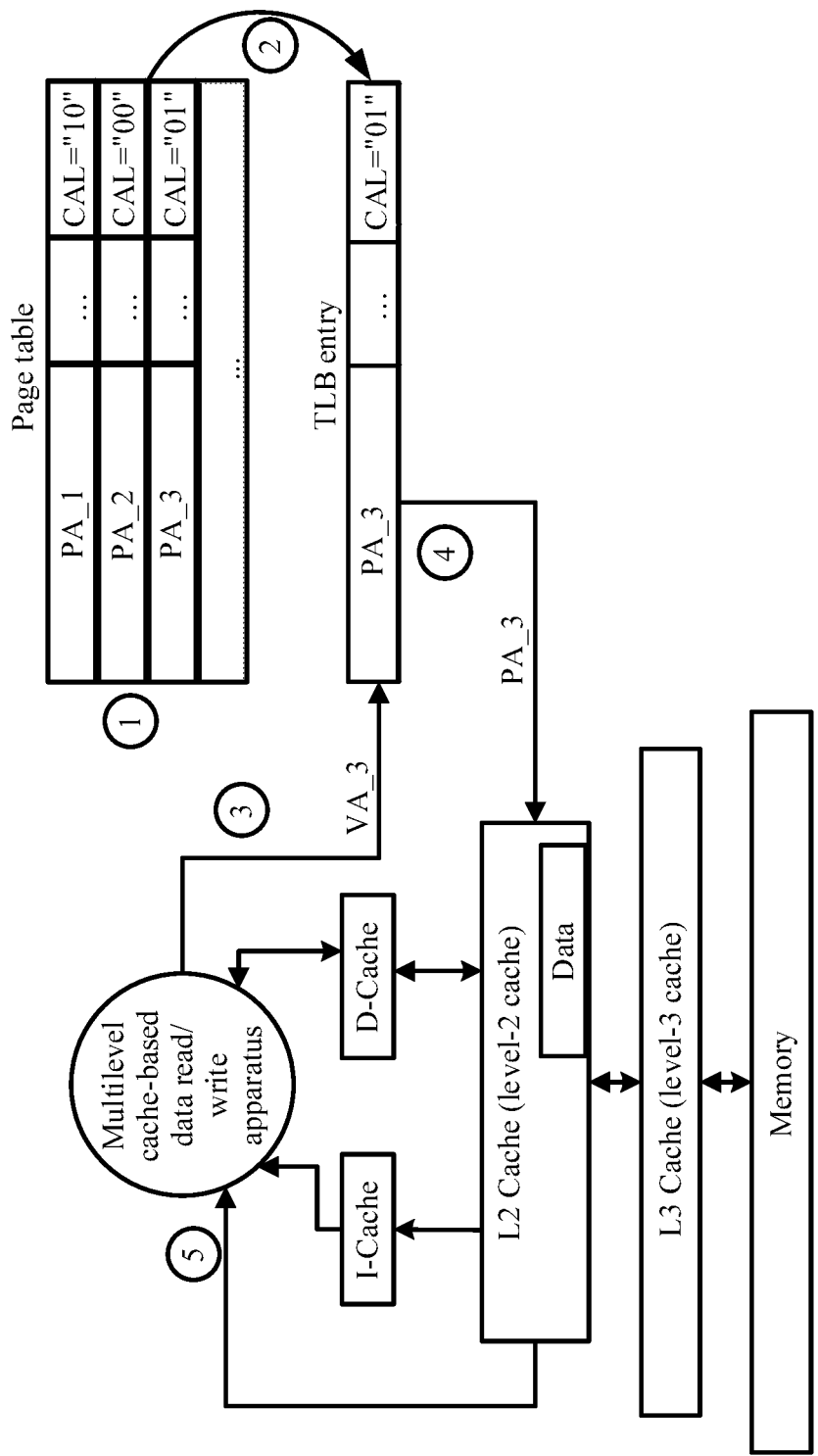
FIG. 3 is a schematic diagram of a multilevel cache-based data read operation method according to an embodiment of the present disclosure.

As shown in FIG. 3, the multilevel cache-based data read method may further include the following steps.

Step (1): Set a cache location attribute of a memory page.

In this specific embodiment, according to an access status of the physical memory page, several bits are added in a page table to identify cache access level (CAL) information, where the CAL information is used to identify a highest level of an enterable cache among levels of caches storable for the memory page. The CAL information may be set by an operating system directly when pages are allocated. In this embodiment, the page table of a memory is shown in FIG. 3. CAL information corresponding to a high-order bit PA_1 of a physical address is "10", CAL information corresponding to a high-order bit PA_2 of the physical address is "00", and CAL information corresponding to a high-order bit PA_3 of the physical address is "01", and so on.

Step (2): A CPU core fills a TLB entry with the foregoing page table in the memory, and uses a reserved bit in the TLB entry to identify the CAL information. If no reserved bit exists, width of the TLB entry may be increased.

It should be noted that in this embodiment, PA_3 is used as an example for description. Therefore, in the TLB entry of FIG. 3, only the page table corresponding to PA_3 is shown, but another page table also exists in the TLB entry.

The foregoing two steps may be performed when a system is initialized or before a program runs, and are not necessarily performed every time when data is read/written.

Step (3): A multilevel cache-based data read/write apparatus in the CPU core queries a high-order bit of the physical address of the memory page and the CAL information.

In this specific embodiment, when initiating a data read request, the multilevel cache-based data read/write apparatus in the CPU core gives a virtual address VA_3, and queries a TLB to find a high-order bit PA_3 of a physical address corresponding to the virtual address VA_3, and "01" serving as CAL information corresponding to the PA_3.

Step (4): According to PA_3 and "01" that serves as CAL information corresponding to PA_3, query whether an L2 cache is hit.

In this specific embodiment, because the CAL information "01" identifies that the highest level among the levels of the caches storable for the memory page is an L2 cache, an L1 cache is ignored, and an access request is initiated to the L2 cache directly, and the high-order bit PA_3 of the physical address is sent. The high-order bit PA_3 of the physical address is compared with a Tag in the L2 cache to obtain a result indicating whether the L2 cache is hit.

If the L2 cache is hit, step (5) is further performed.

Step (5): Transmit required data to the multilevel cache-based data read/write apparatus in the CPU core using a direct data path.

According to the multilevel cache-based data read operation method provided in this embodiment of the present disclosure, a cache location attribute indicates a level of a cache storable for a physical memory data block, so that a CPU core may query, according to the enterable level indicated by the cache location attribute, whether a cache is hit, which is conducive to improving a cache hit rate and conducive to reducing a cache miss rate in a data read operation process.

Embodiment 2

In view of that an L2 cache is missed in step (4) in Embodiment 1, another embodiment is further provided. For the first 4 steps in this embodiment, reference may be made to the first 4 steps in Embodiment 1, which are not described herein again.

Figure 4:
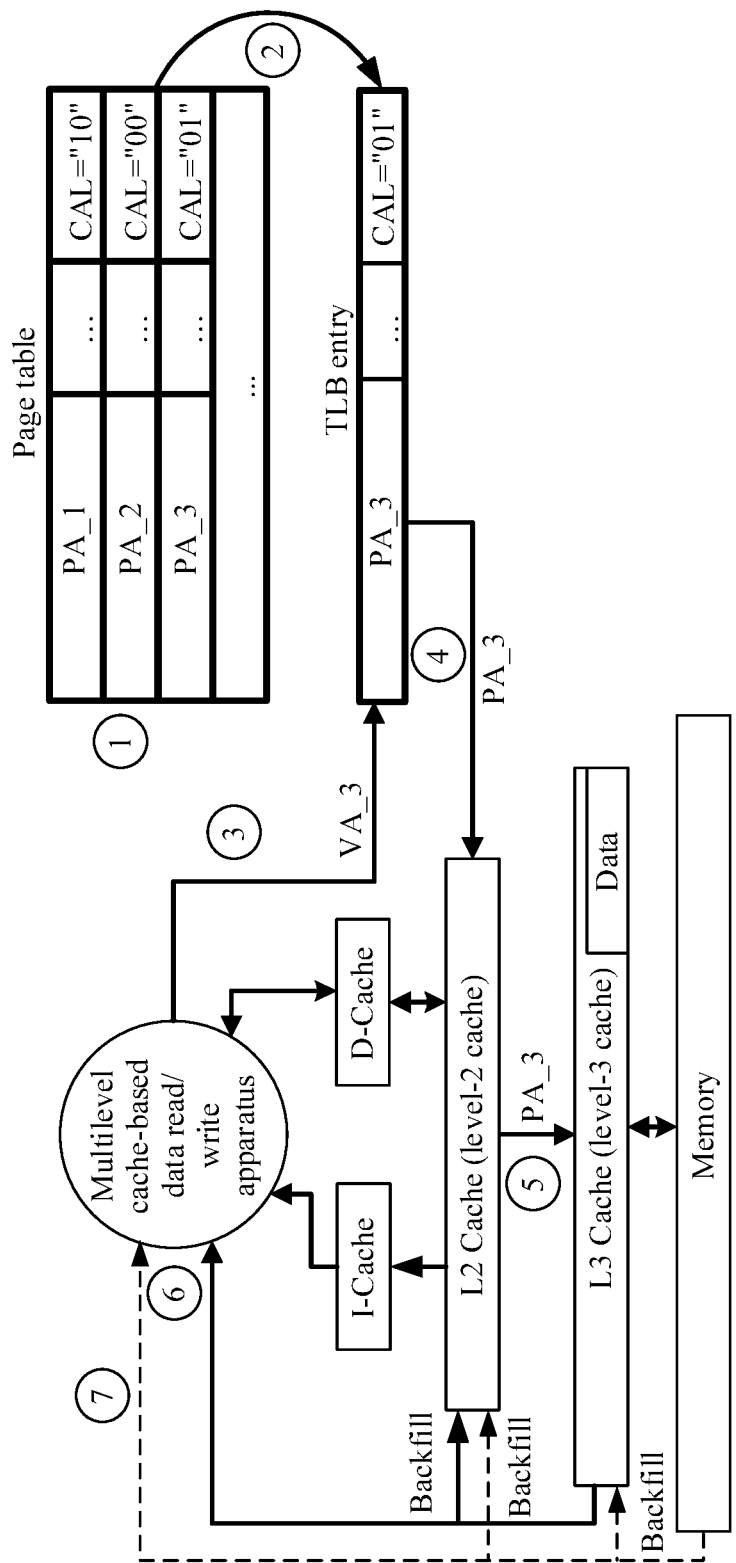
FIG. 4 is a schematic diagram of another multilevel cache-based data read operation method according to an embodiment of the present disclosure.

If the L2 cache in step (4) in Embodiment 1 is missed, as shown in FIG. 4, this embodiment further includes:

Step (5): The multilevel cache-based data read/write apparatus in the CPU core uses the high-order bit PA_3 of a physical address to query whether a next level, namely, L3 cache, is hit.

The multilevel cache-based data read/write apparatus in the CPU core compares the high-order bit PA_3 of the physical address with a Tag in the L3 cache to obtain a result indicating whether the L3 cache is hit.

If the L3 cache is hit, step (6) is further performed. If the L3 cache is missed, step (7) is further performed.

Step (6): If the L3 cache is hit, transmit to-be-read data to the multilevel cache-based data read/write apparatus in the CPU core using a direct data path, and refill the L2 cache with the data at the same time.

Step (7): If the L3 cache is missed, the multilevel cache-based data read/write apparatus in the CPU core searches a memory page corresponding to the memory PA_3 for to-be-read data, transmits the data to the apparatus using a direct data path, and at the same time, refills the data to the L2 cache and the L3 cache.

According to the multilevel cache-based data read operation method provided in this embodiment of the present disclosure, a cache location attribute indicates a level of a cache storable for a physical memory data block, and whether a cache is hit may be queried according to the enterable level indicated by the cache location attribute. Therefore, it is supported that a cache that does not need to be accessed can be skipped, and a cache is hit quickly, which is conducive to improving cache access efficiency and therefore conducive to enhancing a cache hit rate, and in other words, conducive to reducing a cache miss rate in a data read operation process. By restricting a cache location attribute, an infrequently accessed physical memory data block can be prevented from entering a high-level cache with insufficient resources, which is therefore conducive to reducing the cache miss rate in the data read operation process and also avoids futile cache data refill.

Embodiment 3

The following provides a specific implementation solution for a multilevel cache-based data write method according to the foregoing computer system.

Figure 5:
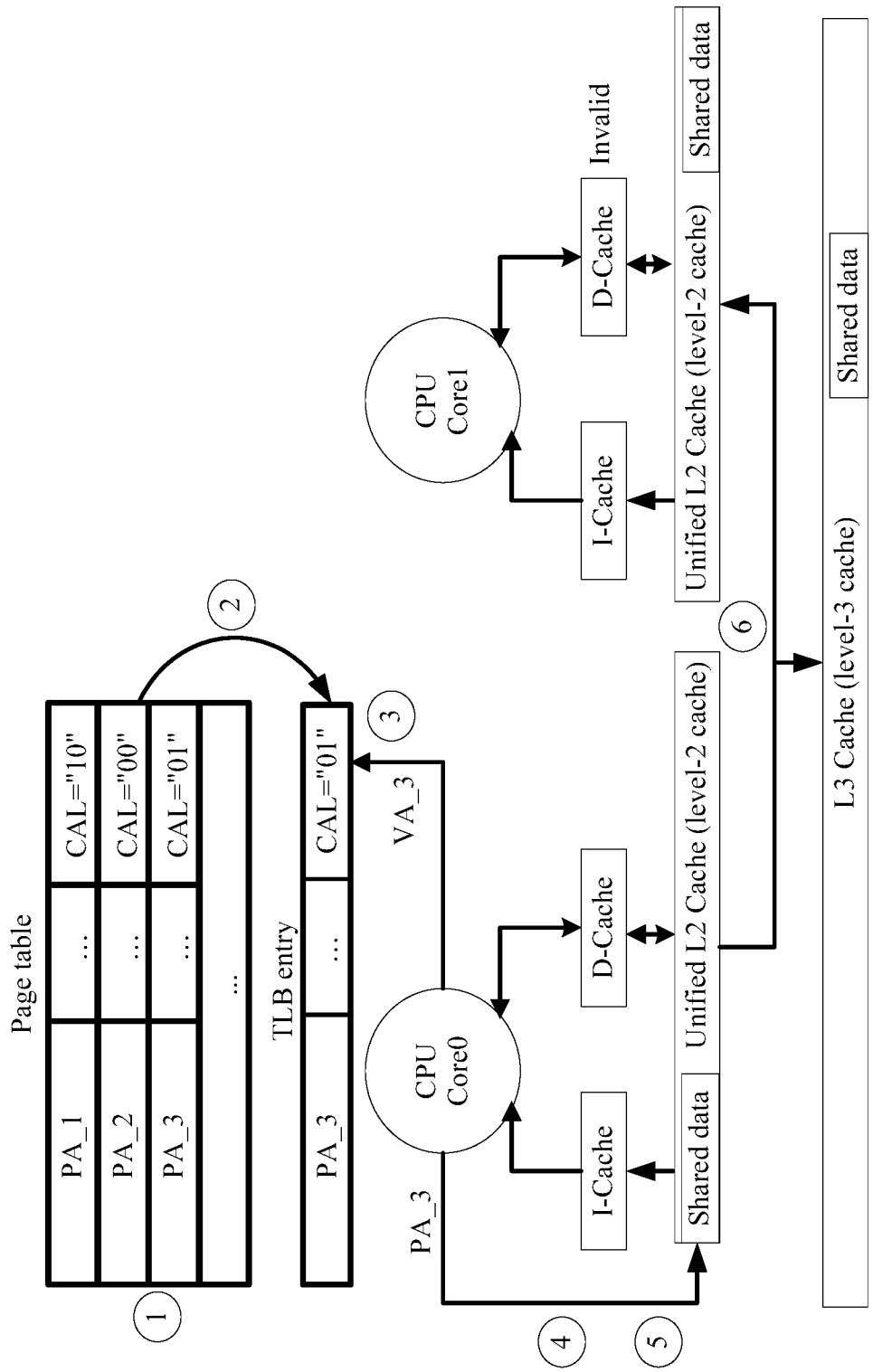
FIG. 5 is a schematic diagram of a multilevel cache-based data write operation method according to an embodiment of the present disclosure.

Settings of a cache location attribute of a memory page in this embodiment are the same as those in Embodiment 1. That is, page tables are the same. Therefore, in this embodiment, when the multilevel cache-based data read/write apparatus in the CPU core initiates a data read/write request, for the first 4 steps, reference may be made to the first 4 steps in Embodiment 1, and a difference is that a data read request is changed to a data write request. Other content is not repeated herein. If the L2 cache in step (4) is hit, as shown in FIG. 5, this embodiment further includes:

Step (5): Write the data into the L2 cache.

Further, if the data written in step (5) is shared data, the following step may be further performed to maintain consistency of the shared data.

Step (6): The multilevel cache-based data read/write apparatus in the CPU core initiates a shared data consistency request to another L2 cache and an L3 cache.

If the L2 cache uses a write-back manner, the shared data in the L3 cache and the shared data in the L2 cache of another CPU core are set to be invalid. If the L2 cache uses a write-through manner, the shared data in the L3 cache is updated by data that is newly written into the L2 cache, and the shared data in the L2 cache of another CPU core is set to be invalid.

According to the multilevel cache-based data write operation method provided in this embodiment of the present disclosure, a cache location attribute indicates a level of a cache storable for a physical memory data block, and whether a cache is hit is queried according to the enterable level indicated by the cache location attribute. Therefore, it is supported that a cache that does not need to be accessed can be skipped, and a cache is hit quickly, which is conducive to improving cache hit efficiency and therefore conducive to enhancing a cache hit rate, and in other words, conducive to reducing a cache miss rate in a data write operation process. By restricting a cache location attribute, an infrequently accessed physical memory data block can be prevented from entering a high-level cache with insufficient resources, which is therefore conducive to reducing the cache miss rate in the data write operation process. For shared data, a consistency request can be sent pertinently to a cache that possibly owns the shared data, thereby reducing cache search and snooping.

Embodiment 4

CAL information in Embodiments 1, 2 and 3 may also be set in an instruction manner. Instead of storing the CAL information in a page table or a TLB, a system register is set for the CAL information. That is, a system register is added to store a cache location attribute so that data can be read/written according to cache location attribute information stored in the system register.

Figure 6:
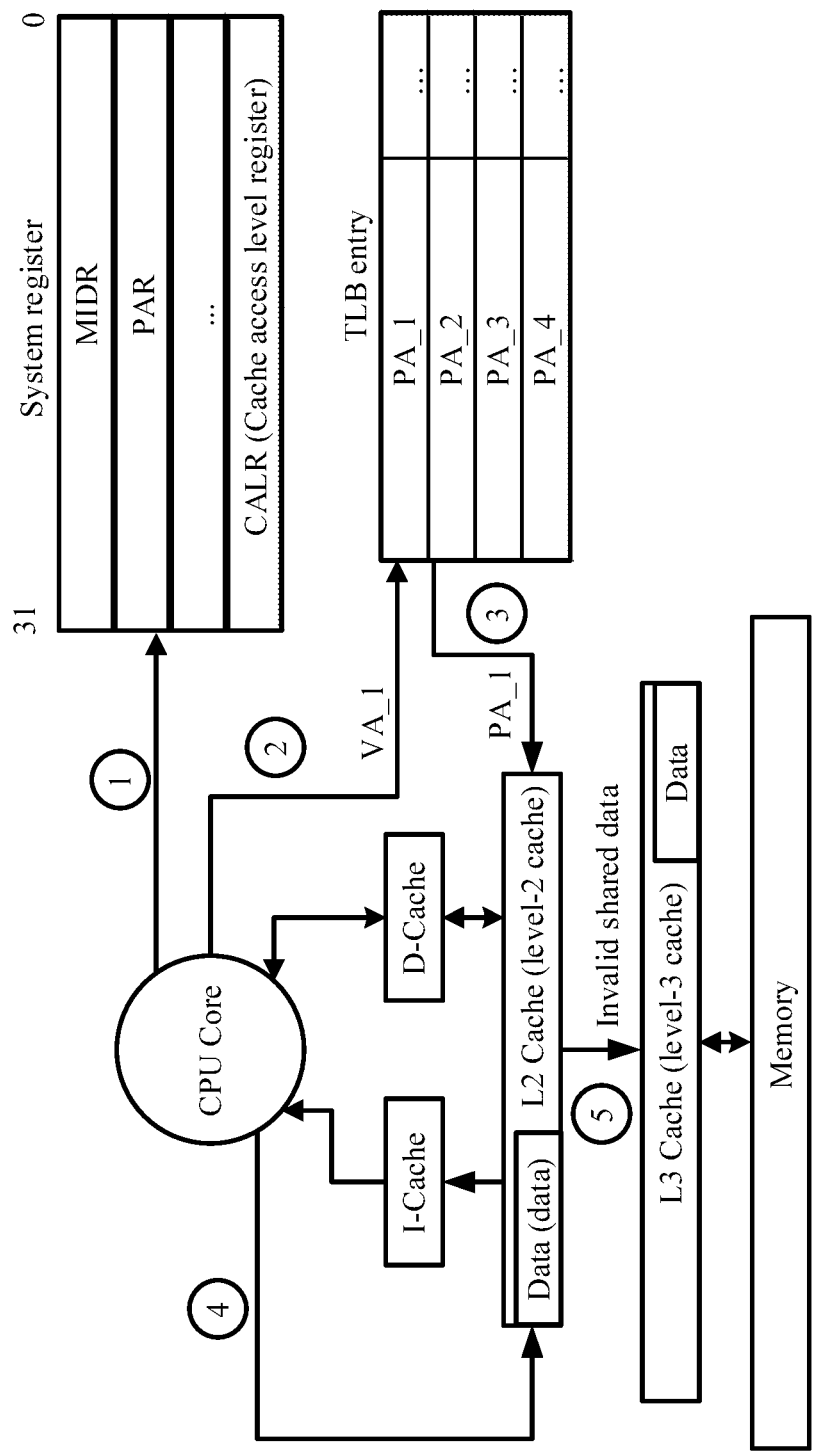
FIG. 6 is a schematic diagram of another multilevel cache-based data write operation method according to an embodiment of the present disclosure.

As shown in FIG. 6, this embodiment provides a multilevel cache-based data write operation method. Specific steps include:

Step (1): A CAL register (CALR) is applied for in a system register file. A new instruction may be added or some bits may be added in an existing instruction set to further set the CALR, and the CALR keeps unchanged until it is set again. As shown in FIG. 6, the system register includes a main identifier register (MIDR) (that is device identifier register), a physical address register (PAR), a CALR, and the like. In this embodiment, the CALR is set to 1 (namely, a value in the CALR is 1, or in other words, the CAL information is 1), and it is indicated that a memory page can enter an L2 cache at most.

Step (2): A multilevel cache-based data read/write apparatus in a CPU core obtains information CALR=1 from the system register in a process of initiating a data write request, and sends a virtual address VA_1 to the TLB.

Step (3): The multilevel cache-based data read/write apparatus in the CPU core queries a high-order bit of a physical address of a memory page.

In this specific embodiment, the multilevel cache-based data read/write apparatus in the CPU core initiates a data write request, and sends a virtual address VA_1 to the TLB. The TLB is responsible for translating the virtual address sent by the apparatus into a high-order bit of the physical address. As shown in FIG. 6, the TLB stores attribute information of a memory page, including PA_1, PA_2, PA_3, and PA_4 of a physical address and the like, but without CAL information. The apparatus uses the virtual address VA_1 to search the TLB to obtain the high-order bit PA_1 of the physical address corresponding to the virtual address VA_1.

Step (4): According to the CALR=1 obtained in step (2) and the PA_1 obtained in step (3), query whether an L2 cache is hit.

Furthermore, the high-order bit PA_1 of the physical address is compared with a Tag in the L2 cache to obtain a result indicating whether the L2 cache is hit.

If the L2 cache is hit, step (5) is further performed.

Step (5): Write the data into the L2 cache directly.

If the data written in step (5) is shared data, reference may be made to the write-back or write-through manner in Embodiment 3 to maintain consistency of the shared data, and no repeated description is given herein again.

In the multilevel cache-based data read/write operation method provided in this embodiment of the present disclosure, a system register CALR is set, a cache location attribute indicates a level of a cache storable for a physical memory data block, and whether a cache is hit is queried according to the enterable level indicated by the cache location attribute. Therefore, it is supported that a cache that does not need to be accessed can be skipped, and a cache is hit quickly, which is conducive to improving cache access efficiency and therefore conducive to enhancing a cache hit rate, and in other words, conducive to reducing a cache miss rate in a data write operation process. By restricting a cache location attribute, an infrequently accessed physical memory data block can be prevented from entering a high-level cache with insufficient resources, which is therefore conducive to reducing the cache miss rate in the data write operation process.

An embodiment of the present disclosure further provides a multilevel cache-based read/write apparatus. The apparatus may be a functional module of a CPU core, and each functional module in the apparatus corresponds to a step in the foregoing method, and is not detailed herein again.

Figure 7:
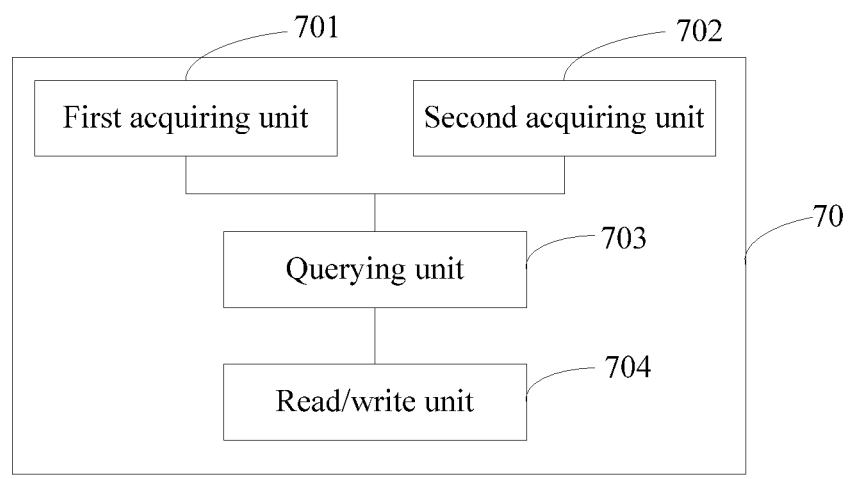
FIG. 7 is a schematic structural diagram of a multilevel cache-based data read/write operation apparatus according to an embodiment of the present disclosure.

As shown in FIG. 7, an apparatus 70 includes a first acquiring unit 701 configured to acquire a first query address of a first physical memory data block in which data is to be read/written, a second acquiring unit 702 configured to acquire a first cache location attribute of the first physical memory data block, where the first cache location attribute is used to indicate a level of a cache storable for the first physical memory data block, a querying unit 703 configured to query whether a cache is hit until one cache is hit or all caches are missed, where the querying is performed according to the first query address obtained by the first acquiring unit 701 and is performed in descending order of levels of caches storable for the first physical memory data block, and the levels of the caches are indicated by the first cache location attribute obtained by the second acquiring unit 702, and a read/write unit 704 configured to, if one cache is hit, read/write the data in the first query address of the first physical memory data block in the cache hit by the querying unit 703, or, if a query result of the querying unit 703 is that all caches are missed, read/write the data in the first query address of the first physical memory data block in a memory.

Further, the first cache location attribute is set in a TLB for the first physical memory data block according to an access status of the first physical memory data block, and the second acquiring unit 702 is configured to query, according to attribute information that is of a physical memory data block and stored in the TLB, a first cache location attribute corresponding to the first query address, where the TLB stores the attribute information of the physical memory data block and the attribute information includes a correspondence between a query address of a physical memory data block and a cache location attribute of the physical memory data block.

Alternatively, further, the first cache location attribute is set in a system register for the first physical memory data block according to an access status of the first physical memory data block, and the second acquiring unit 702 is configured to read a cache location attribute stored in a current system register, and use the cache location attribute as the first cache location attribute of the first physical memory data block, where the system register is used to store the cache location attribute.

Further, the read/write unit 704 is configured to read/write the data in the first query address of the first physical memory data block in the hit cache by using a direct data path between the apparatus 70 and the hit cache; or is configured to read/write the data in the first query address of the first physical memory data block in the memory by using a direct data path between the apparatus 70 and the memory.

Further, the read/write unit 704 is further configured to, during data reading, if a level of the hit cache is a non-highest level in the levels, of the enterable caches, indicated by the first cache location attribute, refill, with to-be-read data, a cache whose level is higher than the level of the hit cache among the levels, of the enterable caches, indicated by the first cache location attribute, or if a level of the hit cache is a highest level in the levels, of the enterable caches, indicated by the first cache location attribute, skip refilling another cache with data; or if all caches are missed, refill, with to-be-read data, an enterable cache indicated by the first cache location attribute.

Further, the read/write unit 704 is further configured to, during data writing, if the written data is shared data, initiate a shared data consistency request to another cache whose level is equal to and/or lower than the level of the hit cache among the levels, of the enterable caches, indicated by the first cache location attribute.

Optionally, the first cache location attribute identifies the highest level among the levels of the caches storable for the first physical memory data block, or identifies a level of a cache that is not storable for the first physical memory data block.

According to the apparatus provided in this embodiment of the present disclosure, a cache location attribute indicates a level of a cache storable for a physical memory data block so that a querying unit in the apparatus can query, according to the enterable level indicated by the cache location attribute, whether a cache is hit. Therefore, it is supported that a cache that does not need to be accessed can be skipped, and a cache is hit quickly, which is conducive to improving cache access efficiency and therefore conducive to enhancing a cache hit rate, and in other words, conducive to reducing a cache miss rate in a data read/write process. By restricting a cache location attribute, an infrequently accessed physical memory data block can be prevented from entering a high-level cache with insufficient resources, which is therefore conducive to reducing the cache miss rate in the data read/write process.

The present disclosure further provides a computer system, where the system includes a processor and a memory connected to the processor.

The memory may be an internal memory, and the memory stores a group of program code. The processor is configured to invoke the program code stored in the memory, where the program code is used to implement any multilevel cache-based data read/write method provided above.

The processor is configured to invoke the program code for multilevel cache-based data read/write to acquire a first query address of a first physical memory data block in which data is to be read/written, acquire a first cache location attribute of the first physical memory data block, where the first cache location attribute is used to indicate a level of a cache storable for the first physical memory data block, query whether a cache is hit until one cache is hit or all caches are missed, where the querying is performed according to the first query address in descending order of levels of caches storable for the first physical memory data block, and the levels of the caches are indicated by the first cache location attribute; and if one cache is hit, read/write the data in the first physical memory data block in the hit cache, or if all caches are missed, read/write the data in the first physical memory data block in the memory.

Optionally, the processor is further configured to invoke the program code for multilevel cache-based data read/write to set a first cache location attribute in a TLB for the first physical memory data block according to an access status of the first physical memory data block, and query, according to attribute information that is of a physical memory data block and stored in the TLB, a first cache location attribute corresponding to the first query address, where the TLB stores the attribute information of the physical memory data block and the attribute information includes a correspondence between a query address of a physical memory data block and a cache location attribute of the physical memory data block.

Optionally, the processor is further configured to invoke the program code for multilevel cache-based data read/write to set a first cache location attribute in a system register for the first physical memory data block according to an access status of the first physical memory data block, read a cache location attribute stored in a current system register, and use the cache location attribute as the first cache location attribute of the first physical memory data block, where the system register is used to store the cache location attribute.

The processor is further configured to invoke the program code for multilevel cache-based data read/write, and read/write the data in the first query address of the first physical memory data block in the hit cache by using a direct data path to the hit cache, or read/write the data in the first query address of the first physical memory data block in the memory using a direct data path to the memory.

Further, the processor is further configured to invoke the program code for multilevel cache-based data read, and if a level of the hit cache is a non-highest level in the levels, of the enterable caches, indicated by the first cache location attribute, the method further includesrefilling, with to-be-read data, a cache whose level is higher than the level of the hit cache among the levels, of the enterable caches, indicated by the first cache location attribute; or if a level of the hit cache is a highest level in the levels, of the enterable caches, indicated by the first cache location attribute, skipping refilling another cache with data; or if all caches are missed, the method further includes refilling, with to-be-read data, an enterable cache indicated by the first cache location attribute.

Further, the processor is further configured to invoke the program code for multilevel cache-based data write, and, if the written data is shared data, initiate a shared data consistency request to another cache whose level is equal to and/or lower than the level of the hit cache among the levels, of the enterable caches, indicated by the first cache location attribute.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present disclosure. The foregoing storage medium includes: any medium that can store program code, such as a universal serial bus (USB) flash drive, a removable hard disk, a read-only memory (ROM), a random access memory (RAM), a magnetic disk, or an optical disc.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A cache-based data read/write method applied in a computer system, comprising:
    acquiring, by a processor, a first query address corresponding to a first physical memory data block where data is to be read/written;
    acquiring, by the processor, a first cache location attribute of the first physical memory data block, wherein the first cache location attribute indicates a level in levels of caches storable for the first physical memory data block,
    wherein the first cache location attribute corresponds to a frequency of data access of the first physical memory data block, and
    wherein the frequency of data access defines a highest enterable level of cache of the levels of caches for the first physical memory data block;
    querying, by the processor, the levels of caches from the highest enterable level of cache to lower levels of caches lower than the highest enterable level of cache and ignoring the levels of caches higher than the highest enterable level of cache to determine whether one level of cache in the queried levels of caches is a hit cache or all the queried levels of caches are missed caches,
    wherein the querying is performed according to the first cache location attribute in descending order of the levels of caches storable for the first physical memory data block;
    reading/writing, by the processor, the data in the first query address of the first physical memory data block in a level of the hit cache when one of the levels of caches in the queried levels of caches is the hit cache; and
    reading/writing, by the processor, the data in the first query address of the first physical memory data block in a memory when all of the queried levels of caches are the missed caches.

2. The method according to claim 1, wherein the first cache location attribute is set in a translation lookaside buffer (TLB) for the first physical memory data block, wherein the method further comprises querying, according to attribute information that corresponds to physical memory data blocks and stored in the TLB, the first cache location attribute corresponding to the first query address, wherein the TLB stores the attribute information of a physical memory data block, and wherein the attribute information comprises a correspondence between a query address of the physical memory data block and a cache location attribute of the physical memory data block.

3. The method according to claim 1, wherein the first cache location attribute is set in a system register for the first physical memory data block, and wherein the method further comprises:
    reading a stored cache location attribute stored in the system register; and
    using the stored cache location attribute as the first cache location attribute of the first physical memory data block.

4. The method according to claim 1, wherein reading/writing the data in the first query address of the first physical memory data block in the level of the hit cache comprises reading/writing the data in the first query address of the first physical memory data block in the level of the hit cache using a direct data path to the level of the hit cache.

5. The method according to claim 1, wherein reading/writing the data in the first query address of the first physical memory data block in the memory comprises reading/writing the data in the first query address of the first physical memory data block in the memory using a direct data path to the memory.

6. The method according to claim 1, further comprising refilling, with to-be-read data, a level of cache whose level is higher than the level of the hit cache among the levels of caches storable, indicated by the first cache location attribute when the level of the hit cache is a non-highest level in the levels of caches storable, indicated by the first cache location attribute.

7. The method according to claim 1, further comprising skipping refilling another cache with data when the level of the hit cache is the highest level in the levels of caches storable, indicated by the first cache location attribute.

8. The method according to claim 1, further comprising refilling, with to-be-read data, a storable cache indicated by the first cache location attribute when all levels of caches are missed.

9. The method according to claim 1, further comprising, after writing the data in the level of the hit cache, initiating a shared data consistency request to another cache whose level is not greater than the level of the hit cache among the levels of caches storable, indicated by the first cache location attribute when the written data is shared data.

10. A computer system, comprising:
a plurality of cache memories organized in a hierarchy;
a processor; and
a memory coupled to the processor and the plurality of cache memories organized in the hierarchy, wherein the processor is configured to:
acquire a first query address, wherein the first query address corresponds to a first physical memory data block where data is to be read/written;
acquire a first cache location attribute of the first physical memory data block, wherein the first cache location attribute indicates a level in levels of caches storable for the first physical memory data block,
wherein the first cache location attribute corresponds to a frequency of data access of the first physical memory data block, and
wherein the frequency of data access defines a highest enterable level of cache of the levels of caches for the first physical memory data block;
query the levels of caches from the highest enterable level of cache to lower levels of caches lower than the highest enterable level of cache and ignoring the levels of caches higher than the highest enterable level of cache to determine whether one level of cache in the queried levels of caches is a hit or all the queried levels of caches are missed caches,
wherein the querying is performed according to the first cache location attribute in descending order of the levels of caches storable for the first physical memory data block;
read/write the data in the first query address of the first physical memory data block in a level of the hit cache when one of the levels of caches in the queried levels of caches is the hit cache; and
read/write the data in the first query address of the first physical memory data block in a memory when all of the queried levels of caches are the missed caches.

11. The computer system according to claim 10, wherein the first cache location attribute is set in a translation lookaside buffer (TLB) for the first physical memory data block, wherein the processor is further configured to query, according to attribute information that corresponds to physical memory data blocks and stored in the TLB, the first cache location attribute corresponding to the first query address, wherein the TLB stores the attribute information of a physical memory data block, and wherein the attribute information comprises a correspondence between a query address of the physical memory data block and a cache location attribute of the physical memory data block.

12. The computer system according to claim 10, wherein the first cache location attribute is set in a system register for the first physical memory data block, and wherein the processor is further configured to:
read a stored cache location attribute stored in the system register; and
use the stored cache location attribute as the first cache location attribute of the first physical memory data block.

13. The computer system according to claim 10, wherein the processor is further configured to read/write the data in the first query address of the first physical memory data block in the level of the hit cache using a direct data path to the level of the hit cache.

14. The computer system according to claim 10, wherein the processor is further configured to read/write the data in the first query address of the first physical memory data block in the memory using a direct data path to the memory.

15. The computer system according to claim 10, wherein the processor is further configured to refill, with to-be-read data, a level of cache whose level is higher than the level of the hit cache among the levels of caches storable, indicated by the first cache location attribute when the level of the hit cache is a non-highest level in the levels of the enterable caches, indicated by the cache location attribute.

16. The computer system according to claim 10, wherein during data reading, the processor is further configured to skip refilling another cache with data when the level of the hit cache is the highest level in the levels of caches storable, indicated by the first cache location attribute.

17. The computer system according to claim 10, wherein during data reading, the processor is further configured to refill, with to-be-read data, a storable cache indicated by the first cache location attribute when all levels of caches are missed.

18. The computer system according to claim 10, wherein during data writing, the processor is further configured to initiate a shared data consistency request to another cache whose level is not greater than the level of the hit cache among the levels of caches storable, indicated by the first cache location attribute when the written data is shared data.

* * * * *